(12) United States Patent
Fujikake et al.

(10) Patent No.: US 10,328,828 B2
(45) Date of Patent: Jun. 25, 2019

(54) HOOKING STRUCTURE FOR SEAT

(71) Applicants: Tachi-S Co., Ltd., Tokyo (JP); Honda Motor Co., Ltd., Tokyo (JP)

(72) Inventors: Tsutomu Fujikake, Tokyo (JP); Tomoyo Futakawame, Saitama (JP); Tomoyuki Uemura, Saitama (JP); Taku Nagasawa, Saitama (JP); Shinobu Sasaki, Saitama (JP)

(73) Assignees: Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/742,548

(22) PCT Filed: Jul. 1, 2016

(86) PCT No.: PCT/JP2016/069708
§ 371 (c)(1),
(2) Date: Jan. 8, 2018

(87) PCT Pub. No.: WO2017/006883
PCT Pub. Date: Jan. 12, 2017

(65) Prior Publication Data
US 2018/0194254 A1    Jul. 12, 2018

(30) Foreign Application Priority Data

Jul. 9, 2015  (JP) .................................. 2015-137576
Sep. 10, 2015 (JP) .................................. 2015-178610

(51) Int. Cl.
*B60N 2/60* (2006.01)
*B60N 2/58* (2006.01)
(Continued)

(52) U.S. Cl.
CPC ......... *B60N 2/6027* (2013.01); *B60N 2/5825* (2013.01); *B68G 7/05* (2013.01); *A44B 19/08* (2013.01)

(58) Field of Classification Search
CPC .. B60N 2/6018; B60N 2/6027; B60N 2/5816; B60N 2/5825; B60N 2/6045;
(Continued)

(56) References Cited

U.S. PATENT DOCUMENTS

2006/0214485 A1* 9/2006 Brockschnieder ... B60N 2/5816
297/228.11
2009/0064471 A1* 3/2009 Santin .................. A47C 31/023
24/581.11
(Continued)

FOREIGN PATENT DOCUMENTS

DE        3631872 C1 * 10/1987 ........... B60N 2/0284
DE   102008062346 A1 *  6/2010 ........... B60N 2/5816
(Continued)

OTHER PUBLICATIONS

International Search Report issued in corresponding International Patent Application No. PCT/JP2016/069708 dated Sep. 27, 2016.

*Primary Examiner* — Timothy J Brindley
(74) *Attorney, Agent, or Firm* — Morgan, Lewis & Bockius LLP

(57) ABSTRACT

A hooking structure includes a fastening member that is configured from an open-type slide fastener and is not stitched to a base trim cover, and a plastic fixing member for fixing one fastener half part to a seat member in a groove part formed in a seat member and used for hooking. The fastening member is provided with a locked part, the fixing member is provided with a flexible locking part that locks with the locked part, and the other fastener half part and a dressing cover are anchored together by an anchoring part.

19 Claims, 16 Drawing Sheets

(51) Int. Cl.
*B68G 7/05* (2006.01)
*A44B 19/08* (2006.01)

(58) Field of Classification Search
CPC .. B60N 2/6036; B60N 2/5841; B60N 2/5858; B60N 2/5833
See application file for complete search history.

(56) References Cited

U.S. PATENT DOCUMENTS

| | | | | |
|---|---|---|---|---|
| 2009/0121530 A1* | 5/2009 | Yasuda | | B60N 2/5816 297/224 |
| 2009/0160230 A1* | 6/2009 | Yasuda | | B60N 2/5816 297/228.13 |
| 2011/0309667 A1* | 12/2011 | Stiller | | B60N 2/5825 297/452.58 |
| 2012/0306256 A1* | 12/2012 | Okuyama | | B60N 2/5825 297/452.6 |
| 2015/0165947 A1* | 6/2015 | Clauser | | B60N 2/5825 297/452.18 |
| 2015/0328808 A1* | 11/2015 | Sasaki | | B29C 44/1204 264/46.4 |

FOREIGN PATENT DOCUMENTS

| | | | | |
|---|---|---|---|---|
| EP | 2774807 A2 * | 9/2014 | | B60N 2/5825 |
| EP | 3072735 A1 * | 9/2016 | | B60N 2/5825 |
| FR | 2921873 A1 * | 4/2009 | | B60N 2/0284 |
| FR | 2939085 A1 * | 6/2010 | | B60N 2/5825 |
| JP | H02-141256 U | 11/1990 | | |
| JP | 2003-024187 A | 1/2003 | | |
| JP | 2006-122594 A | 5/2006 | | |
| JP | 2009153560 A * | 7/2009 | | B60N 2/5816 |
| JP | 2016097947 A * | 5/2016 | | B60N 2/60 |
| JP | 2016202673 A * | 12/2016 | | B60N 2/90 |
| JP | 2016203825 A * | 12/2016 | | A47C 31/02 |
| WO | WO-2007008662 A2 * | 1/2007 | | B60N 2/5825 |
| WO | WO-2015029131 A1 * | 3/2015 | | A47C 31/023 |
| WO | WO-2016084757 A1 * | 6/2016 | | B60N 2/60 |
| WO | WO-2016121617 A1 * | 8/2016 | | B68G 7/05 |

\* cited by examiner

HOOKING STRUCTURE FOR SEAT

TECHNICAL FIELD

The present invention relates to a hooking structure for a seat.

BACKGROUND ART

A seat bottom or a backrest that constitutes a vehicle seat generally includes a cushion material made of a foam material, a trim cover which covers the cushion material, and the like. Furthermore, a seat further provided with wadding or a removable dressing cover changeable according to a user's preference is also used.

For example, Patent Document 1 proposes a vehicle seat in which a groove part for hooking is formed in a seat cushion body and a cover body is removably provided on the seat cushion body with a slide fastener provided in the groove part. In this specification, one fastener strip of the slide fastener is attached to the side peripheral surface of the seat cushion body and to the groove part formed in the seating surface, while the other fastener strip is attached to the rim of the cover body and to the inner surface part so as to be engageable with one fastener strip (refer to Patent Document 1).

CITATION LIST

Patent Document

Patent Document 1: Utility Model Application Publication No. H02-141256

SUMMARY

Technical Problem

The above-described vehicle seat, however, adopts a structure in which a trim cover (cover body) is configured to be fittable or removable so as to dress the seat with a slide fastener that is stitched to the base trim cover (particularly in Patent Document 1, the base trim cover corresponds to a main pad cover which wraps around the seat cushion body and a side pad upper cover which covers the side part of the pad). Therefore, if the slide fastener is broken, the entire base trim cover needs to be replaced, thus increasing the repair cost.

Therefore, an object of the present invention is to provide a hooking structure for a seat that reduces repair cost by enabling a replacement of only a fastening member without a replacement of a base trim cover in the case of breakage of a fastening member for use in fitting and removing a dressing cover.

Solution to Problem

In order to achieve the object, the present invention provides a hooking structure for a seat in which a dressing cover is hooked to be supported removably from a seat member provided with a base trim cover, including: a fastening member that is configured from an open-type slide fastener and is not stitched to the base trim cover, where the open-type slide fastener includes a fastener part that is formed of one fastener half part and the other fastener half part and a slider part that slides along the fastener part to open and close the one fastener half part and the other fastener half part; and a plastic fixing member that fixes the one fastener half part to the seat member in a groove part for hooking formed in the seat member, wherein: the fastening member is provided with a locked part; the fixing member is provided with a flexible locking part that locks the locked part; and the other fastener half part and the dressing cover are anchored together by an anchoring part.

In this hooking structure, the fastening member is not stitched to the base trim cover and therefore the base trim cover and the fastening member are independent of each other, thus enabling only the fastening member to be replaced by releasing the fixing by the fixing member with the base trim cover left as it is. Therefore, in the case of a broken fastening member, only the fastening member is able to be replaced without a replacement of the base trim cover.

Moreover, the fixing member is made of plastic and has a flexible locking part, and therefore the locked part of the fastening member is able to be unlocked by deflecting and deforming the locking part. The work of deforming the plastic locking part in this manner is able to be carried out with bare hands. Therefore, the hooking structure enables a hooking work or a work of removing the trim cover without using a tool.

Furthermore, the plastic fixing member looks better than a metal fixing member and is less likely to give an uncomfortable feeling.

The locking part of the fixing member may have a pair of locking claws that sandwich the locked part. This type of locking part sandwiches the locked part between the pair of locking claws to hold the locked part with being locked by the locking claws.

Preferably the locked part has a wedge-shaped cross section. Pressing the locked part having the wedge-shaped cross section to the locking part of the fixing member causes the pair of locking claws to be pressed apart, which thereby facilitates the work of pushing and locking the locked part. Furthermore, the locked part is able to be detached from the locking part by turning and rotating the locked part sandwiched between the locking claws and then pulling the tip of the wedge toward between the pair of locking claws.

Preferably, the fixing member has an inclined plane for applying a force of pushing open the pair of locking claws upon pressing of the locked part. Pushing the locked part of the fastening member to the locking part causes the pair of locking claws to be pushed open through the inclined plane, thereby enabling the locked part to be easily pushed into between the pair of locking claws.

The locked part may have a rectangular cross section.

The seat member may be provided inside with an insert member that locks the fixing member and the fixing member may have a fastening part able to be hooked on the insert member. The fastening part enables the fixing member to be locked by hooking the fixing member on the insert member. Moreover, the locked state can be easily released by detaching the fastening part.

The locked part may include a plastic molding product.

The locked part may be formed of a plastic plate integrated into the one fastener half part.

The locked part may be formed of a plastic cord integrated into the one fastener half part.

The locked part may be formed of a plastic cord inserted into the one fastener half part that is sewn into a bag shape.

The locked part may be provided in a joint member that constitutes a part of the one fastener half part.

In the hooking structure, a hole may be formed in the base trim cover so that the fixing member having passed through the hole locks with the insert member.

Furthermore, according to the present invention, there is provided a hooking structure for a seat in which a dressing cover is hooked to be supported removably from a seat member, including: a fastening member that is configured from an open-type slide fastener, where the open-type slide fastener includes a fastener part that is formed of one fastener half part and the other fastener half part and a slider part that slides along the fastener part to open and close the one fastener half part and the other fastener half part; and a plastic fixing member that fixes the one fastener half part to the seat member in a groove part for hooking formed in the seat member, wherein: the fastening member is provided with a locked part; the fixing member is provided with a flexible locking part that locks the locked part; and the other fastener half part and the dressing cover are anchored together by an anchoring part.

In this hooking structure, in the case of breakage of a fastening member for use in fitting and removing the dressing cover, only the fastening member can be replaced, thereby enabling a reduction of repair cost.

The locking part of the fixing member may have a pair of locking claws that sandwich the locked part. This type of locking part sandwiches the locked part between the pair of locking claws to hold the locked part with being locked by the locking claws.

Preferably, the locked part has a wedge-shaped cross section. Pressing the locked part having the wedge-shaped cross section to the locking part of the fixing member causes the pair of locking claws to be pressed apart, which thereby facilitates the work of pushing and locking the locked part. Furthermore, the locked part can be detached from the locking part by turning and rotating the locked part sandwiched between the locking claws and pulling the tip of the wedge toward between the pair of locking claws.

Preferably, the fixing member has an inclined plane for applying a force of pushing open the pair of locking claws upon pressing of the locked part. Pushing the locked part of the fastening member to the locking part causes the pair of locking claws to be pushed open through the inclined plane, thereby enabling the locked part to be easily pushed into between the pair of locking claws.

The locked part may have a rectangular cross section.

The seat member may be provided inside with an insert member that locks the fixing member and the fixing member may have a fastening part able to be hooked on the insert member. The fastening part enables the fixing member to be locked by hooking the fixing member on the insert member. Moreover, the locked state can be easily released by detaching the fastening part.

The seat member may be provided inside with an insert member that locks the fixing member and the fixing member may have a fastening part able to be hooked on the insert member. The fastening part enables the fixing member to be locked by hooking the fixing member on the insert member. Moreover, the locked state can be easily released by detaching the fastening part.

The locked part may be formed of a plastic plate integrated into the one fastener half part.

The locked part may be formed of a plastic cord integrated into the one fastener half part.

The locked part may be formed of a plastic cord inserted into the one fastener half part that is sewn into a bag shape.

The locked part may be provided in a joint member that constitutes a part of the one fastener half part.

Advantageous Effects of Invention

According to the present invention, in the case of breakage of a fastening member for use in fitting and removing the dressing cover, only the fastening member can be replaced without a replacement of a base trim cover, thereby enabling a reduction of repair cost needed therefor.

DESCRIPTION OF EMBODIMENTS

Figure 1:
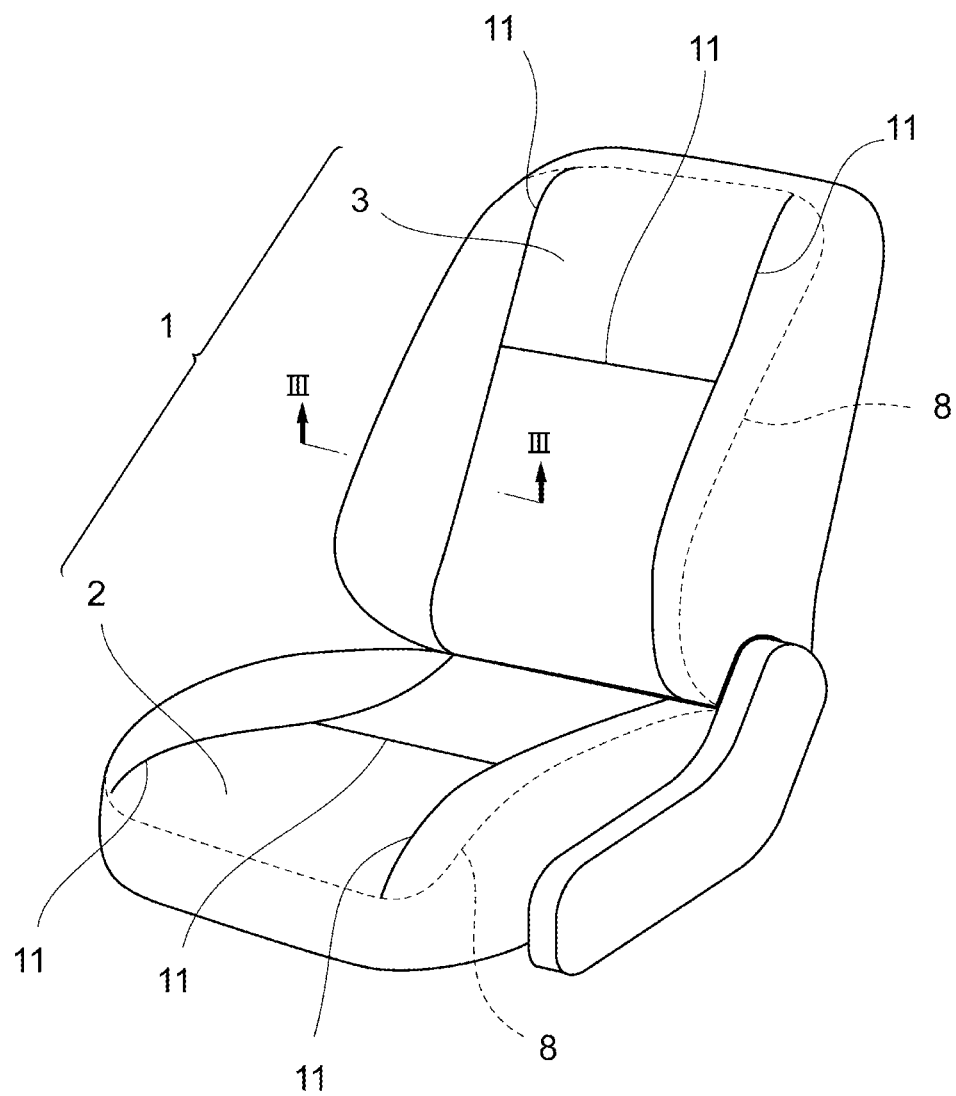
FIG. 1 is a perspective view illustrating one embodiment of a seat.

Hereinafter, detailed description will be made on preferable embodiments of a hooking structure for a seat according to the present invention with reference to drawings (see FIGS. 1 to 12).

A seat 1 includes a seat bottom 2 movable back and forth on a floor panel of a vehicle and a backrest 3 capable of reclining to the seat bottom 2. The seat bottom 2 and the backrest 3 are seat members that constitute the seat 1 and each include a cushion material 4 made of foam. Moreover, a dressing cover 7 is fittable or removable to or from the seat bottom 2 and the backrest 3 by using a hooking structure 10. The seat bottom 2 and the backrest 3 are provided with a plurality of linear hooking grooves 11 that constitute the hooking structure 10 (see FIG. 1).

A description will now be made by giving an example of the backrest 3. The cushion material 4 constituting the backrest 3 has a main cushion part 41 for use in supporting the back of an occupant from the rear and a side cushion part 42 for use in holding the back of the occupant from the side (see FIG. 3). The surface of the cushion material 4 is coated with the base trim cover 6 by using, for example, an adhesive or integral foam molding.

Figure 3:
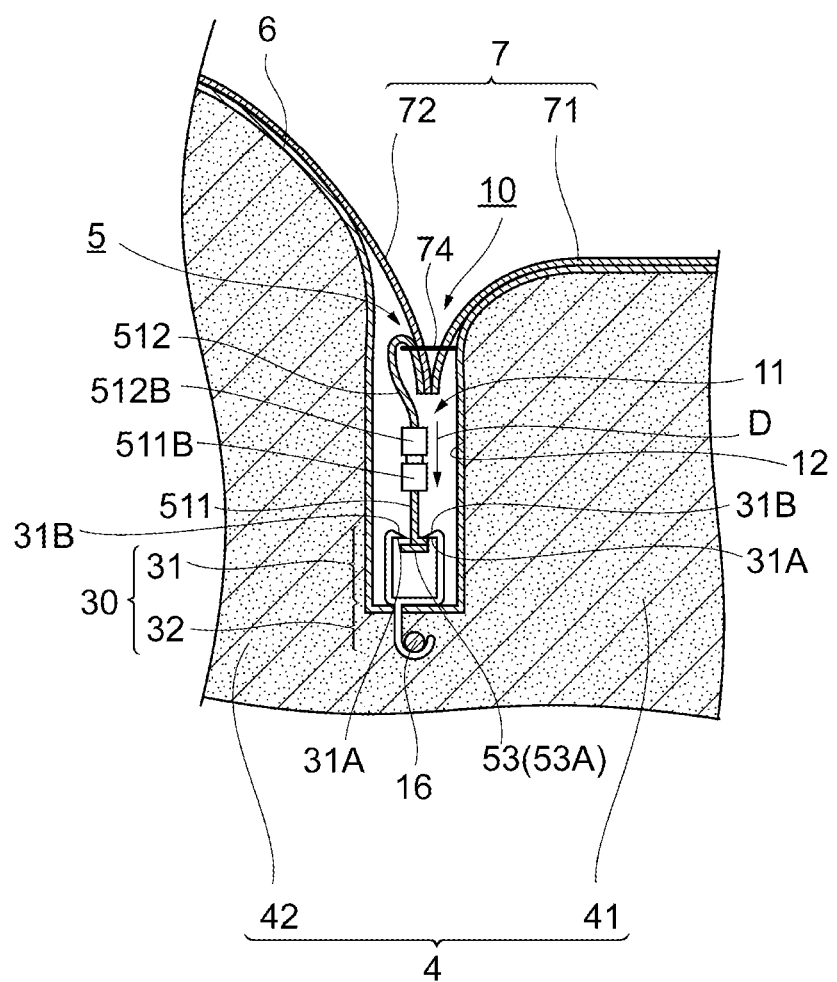
FIG. 3 is a cross-sectional view illustrating an example of a hooking structure for a backrest (seat member) taken along line III-III of FIG. 1.

The dressing cover 7 is formed of a main surface part 71 placed on the main cushion part 41 of the cushion material 4 and a side surface part 72 placed on the side cushion part 42 (see FIG. 3). The main surface part 71 and the side surface part 72 of the dressing cover 7 are joined by a stitched part 74 with their surfaces kept in contact with each other. When the cushion material 4 and the base trim cover 6 are covered with the dressing cover 7 in a state where the front face thereof facing the seated person side and the rear face thereof facing the cushion material 4 side, the stitched part 74 and a portion ahead of the stitched part 74 of the dressing cover 7 are not exposed to the front face side (see FIG. 3).

Furthermore, the dressing cover 7, which is hooked to be supported in the hooking groove 11 by using the fastening member 5, is attached to the backrest 3 or the seat bottom 2 at its outer periphery by the outer-periphery dressing fastener 8. In the present specification and drawings, only the arrangement example of the outer-periphery dressing fastener 8 is illustrated (see FIG. 1) and the description of its structure is omitted. In addition, although not specifically illustrated, wadding may be provided between the base trim cover 6 and the dressing cover 7.

Figure 2:
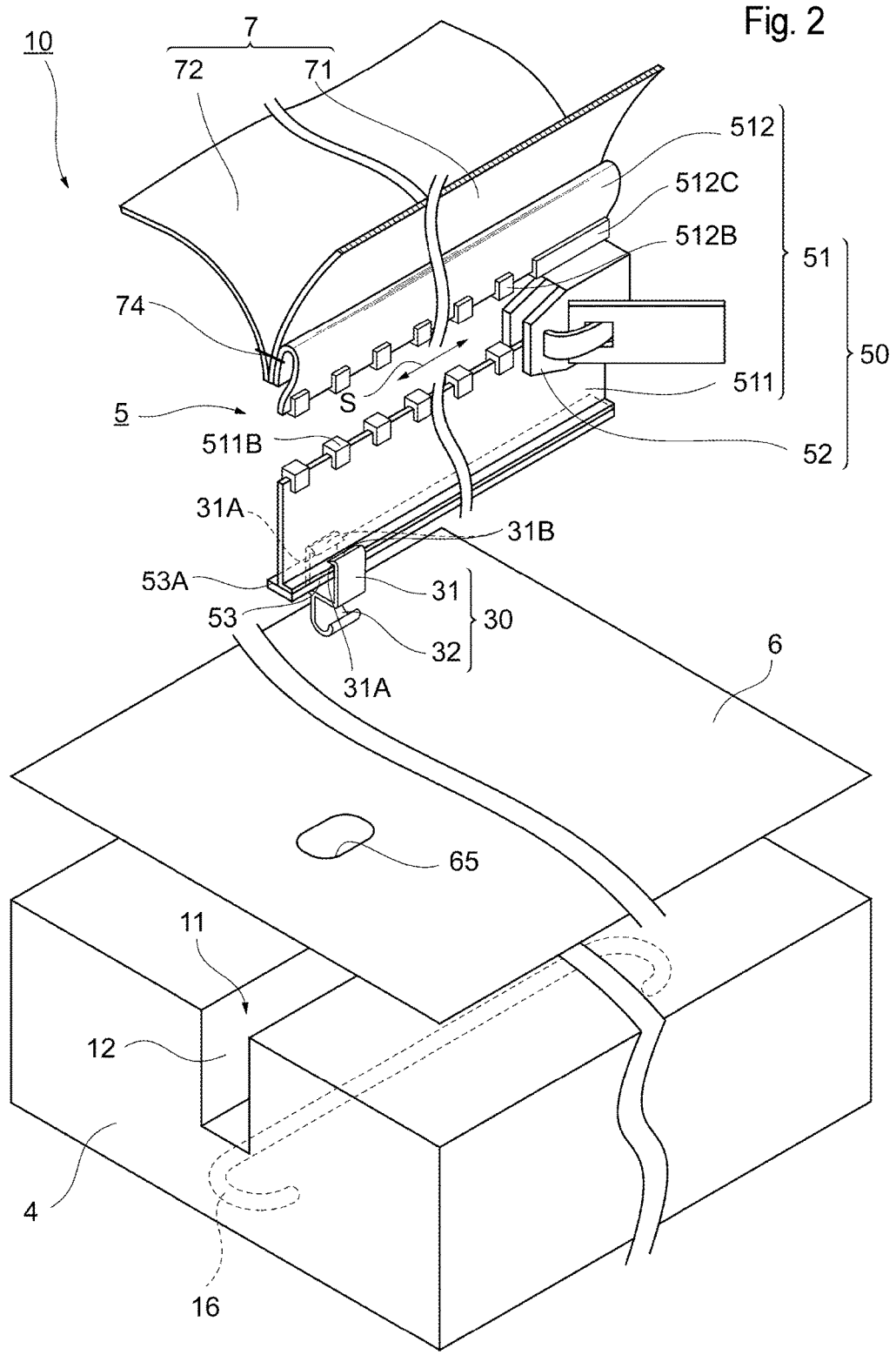
FIG. 2 is a perspective view illustrating an example of a hooking structure according to the present invention.

The hooking structure 10 for hooking and supporting the dressing cover 7 includes the fastening member 5, the hooking groove 11, an insert wire 16, and a plastic fixing clip (fixing member) 30 (see FIG. 2).

The hooking groove 11 is formed of a concave portion 12, which is formed with a predetermined depth in a vertical direction of the backrest 3 along the boundary between the main cushion part 41 and the side cushion part 42. The hooking groove 11 forms an appearance of the seat 1 and stores a base-side tape part (one fastener half part) 511 of the fastening member 5, which is used for hooking the dressing cover 7. Although the concave portion 12 is compressed and closed between the main cushion part 41 and the side cushion part 42 by elasticity of the cushion material 4 in the normal state, FIG. 3 illustrates the concave portion 12 that opens so as to make it easier to understand.

Although the backrest 3 is further provided with a hooking groove 11 extending in a horizontal direction (in a width direction of the backrest 3) in addition to the aforementioned hooking groove 11, and the seat bottom 2 is also provided with a hooking groove 11 (see FIG. 1). In the present embodiment, however, a description will be continued by giving an example of the hooking groove 11 that includes the concave portion 12, which is formed in the vertical direction as described in the above.

The fastening member 5 is a member that enables the dressing cover 7 to be fitted or removed in the hooking groove 11 formed in the cushion material 4. The fastening member 5 of the present embodiment is formed of a slide fastener 50 including a fastener part 51 and a slider part 52 (see FIGS. 2 and 3). Although any break line is not expressly provided in FIG. 2, the cushion material 4, the fastening member 5, and the dressing cover 7 are only partially illustrated. A cover-side tape part 512 (the other fastener half part) of the fastener part 51 of the fastening member 5 is inserted into the hooking groove 11 in the depth direction D of the concave portion 12 and is engaged with the base-side tape part 511 for fastening of the fastening member 5, thereby enabling the dressing cover 7 to be secured to the seat 1 by hooking.

The fastener part 51 of the slide fastener 50 includes the base-side tape part 511 and the cover-side tape part 512. The base-side tape part 511 and the cover-side tape part 512 include elements (teeth) 511B and 512B engaging with each other and insert pins (only an insert pin 512C of the cover-side tape part 512 is illustrated in FIG. 2 and the like) (See FIG. 2 and the like).

The slider part 52 of the slide fastener 50 slides on the fastener part 51 in the direction in which the elements 511B and 512B are aligned (hereinafter, the direction will be referred to as "slide direction" and indicated by character S), so that the element 511B of the base-side tape part 511 engages with the element 512B of the cover-side tape part 512 to fasten the fastening member 5 or so that the engagement is released so as to release the fastening of the fastening member 5.

The cover-side tape part 512 is stitched together with the main surface part 71 and the side surface part 72 of the dressing cover 7 in the stitched part 74 and anchored to the dressing cover 7 (see FIGS. 2 and 3 and the like). Although the case of stitching is illustrated here, the cover-side tape part 512, the main surface part 71, and the side surface part 72 may be anchored to each other by welding or the like, instead.

A locked part 53 is formed at the edge of the base-side tape part 511. The locked part 53 has an enough width that the locked part 53 is locked with the locking part 31 of the plastic clip 30 (see FIG. 2 and the like).

Although a specific configuration of the locked part 53 is not particularly limited, the locked part 53 may include a plastic molding product. For example, the locked part 53 may be configured by sewing a plate-like plastic plate 53A on the edge of the base-side tape part 511 so as to be integrated into the base-side tape part 511 (see FIG. 2). The plastic member integrated into the base-side tape part 511 in this manner reinforces at least the portion fixed to the cushion material 4 by the plastic clip 30 in the base-side tape part 511, prevents the base-side tape part 511 from being broken, and makes it easier to keep the tension acting at the time of hooking constant.

Figure 6:
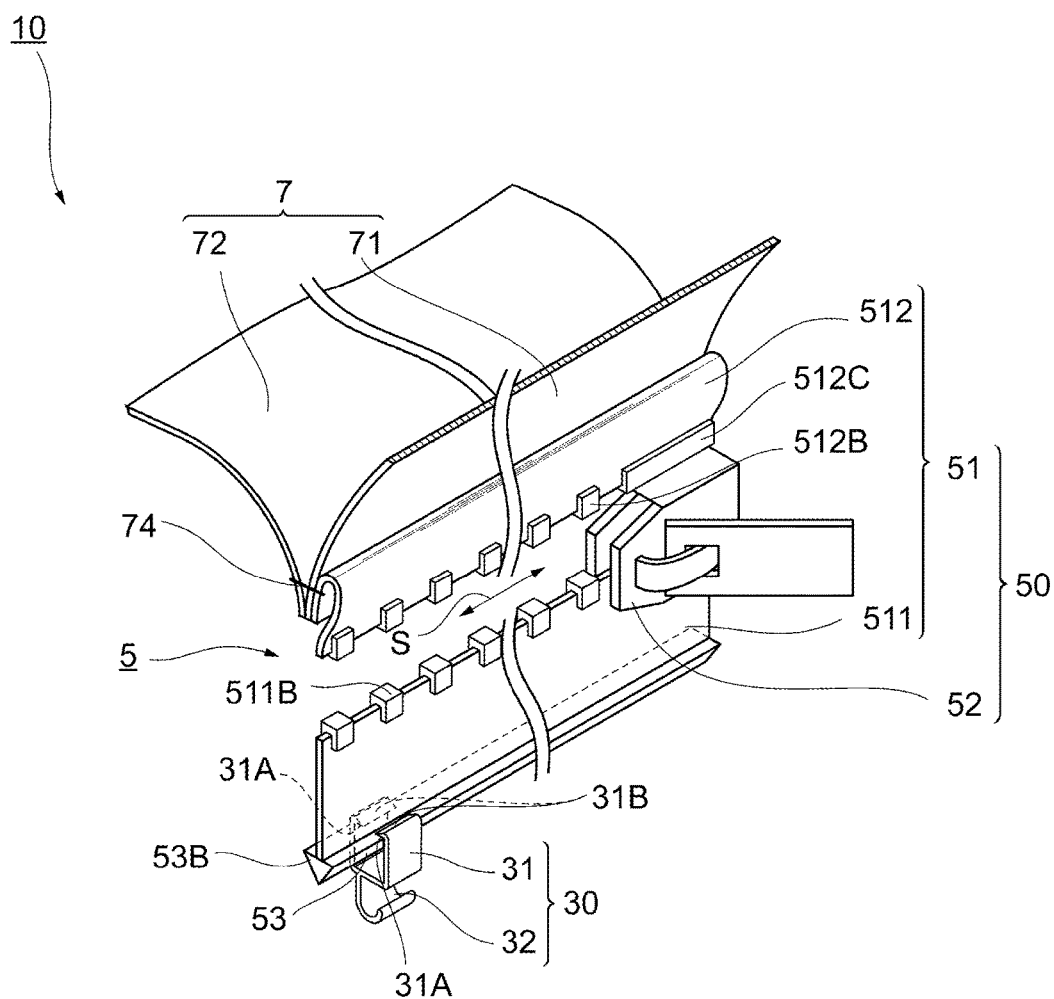
FIG. 6 is a perspective view of a fastening member, a fixing member, and the like illustrating another example of the hooking structure.
Figure 7:
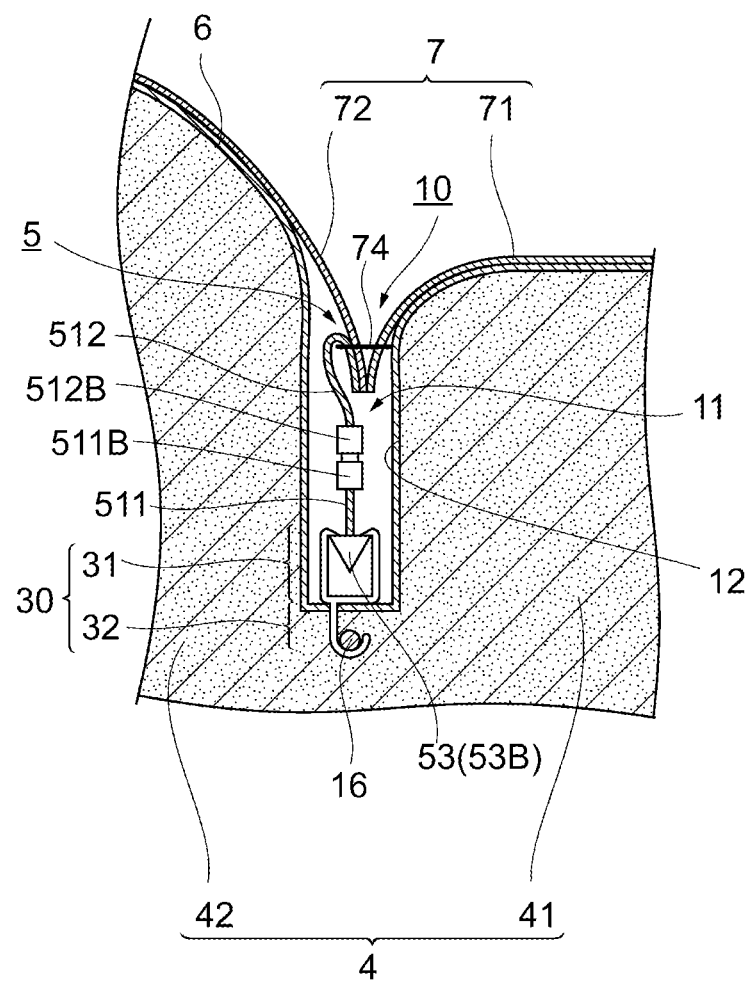
FIG. 7 is a cross-sectional view of the hooking structure illustrated in FIG. 6.
Figure 8:
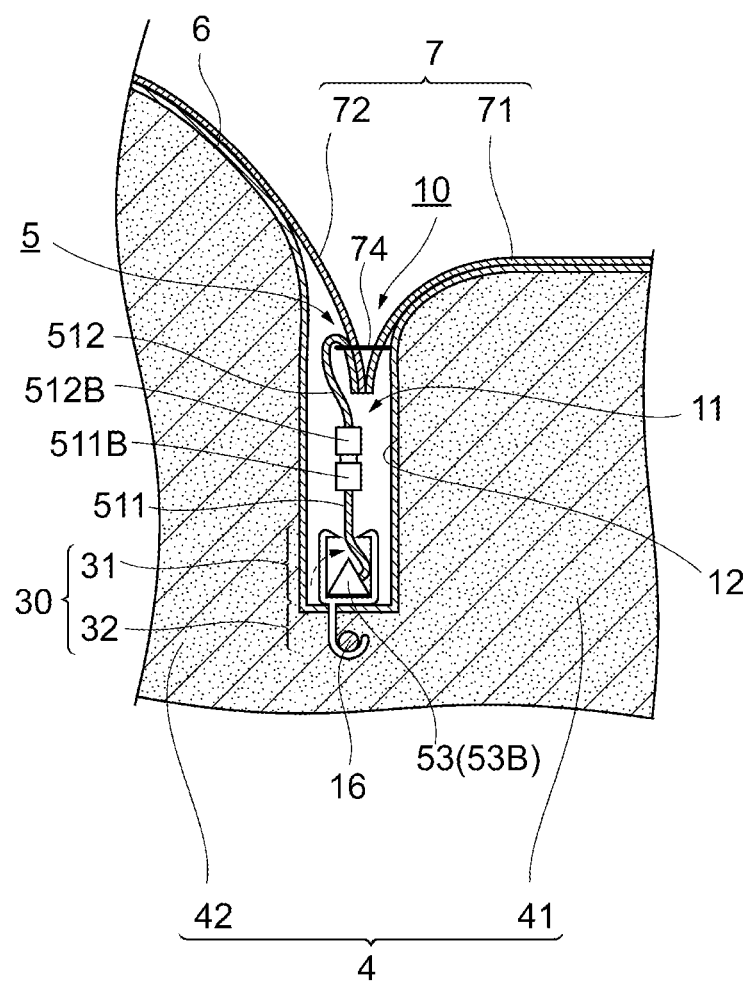
FIG. 8 is a cross-sectional view illustrating a state in which a plastic cord (locked part) is rotated in the hooking structure illustrated in FIG. 7.

In another example, the locked part 53 may be formed of a plastic cord 53B that has been molded along the edge of the base-side tape part 511 (see FIGS. 6 and 7). The plastic cord 53B has a wedge-shaped cross section such as, for example, a triangular-shaped cross section. Moreover, the use of plastic integral molding makes it easier to reduce cost required for forming the locked part 53.

Figure 10:
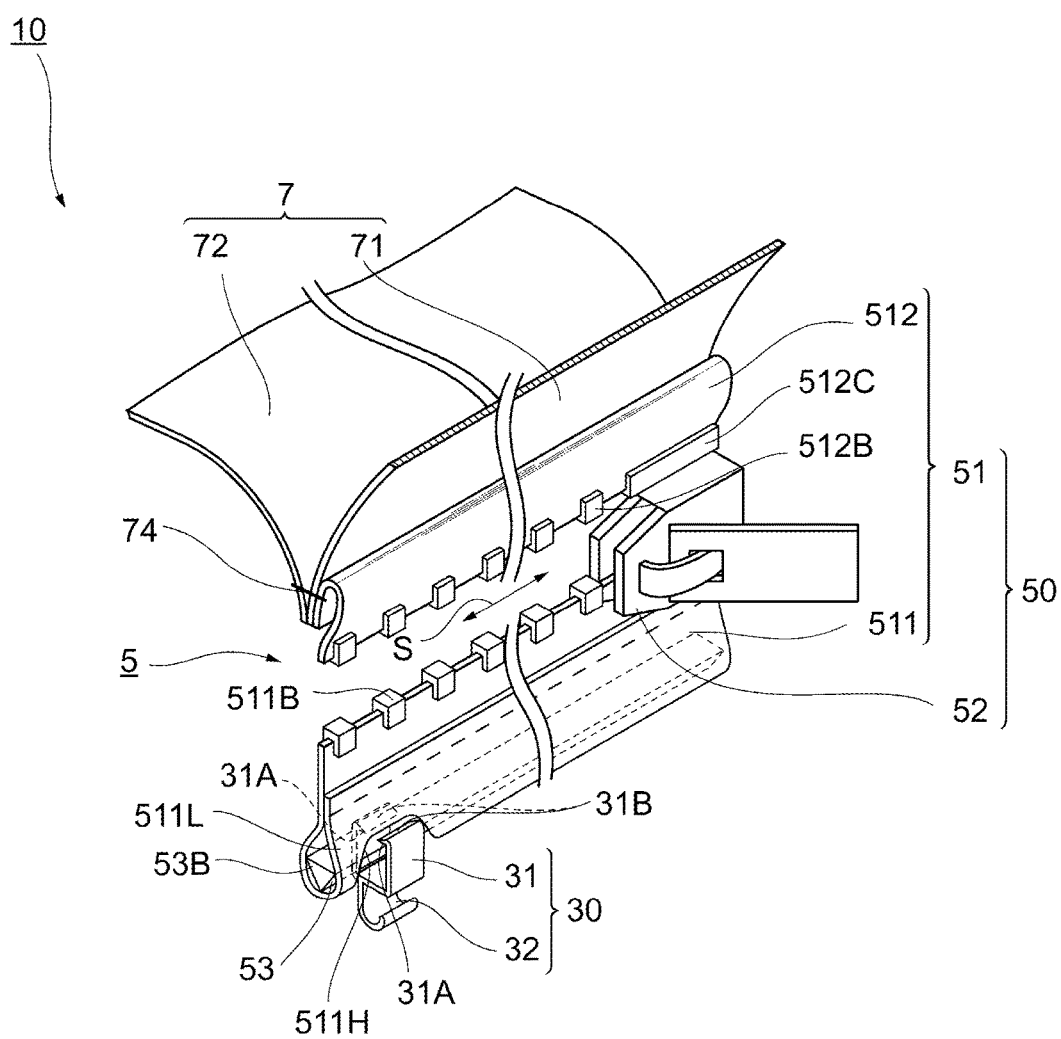
FIG. 10 is a perspective view of a fastening member, a fixing member, and the like illustrating still another example of the hooking structure.
Figure 11:
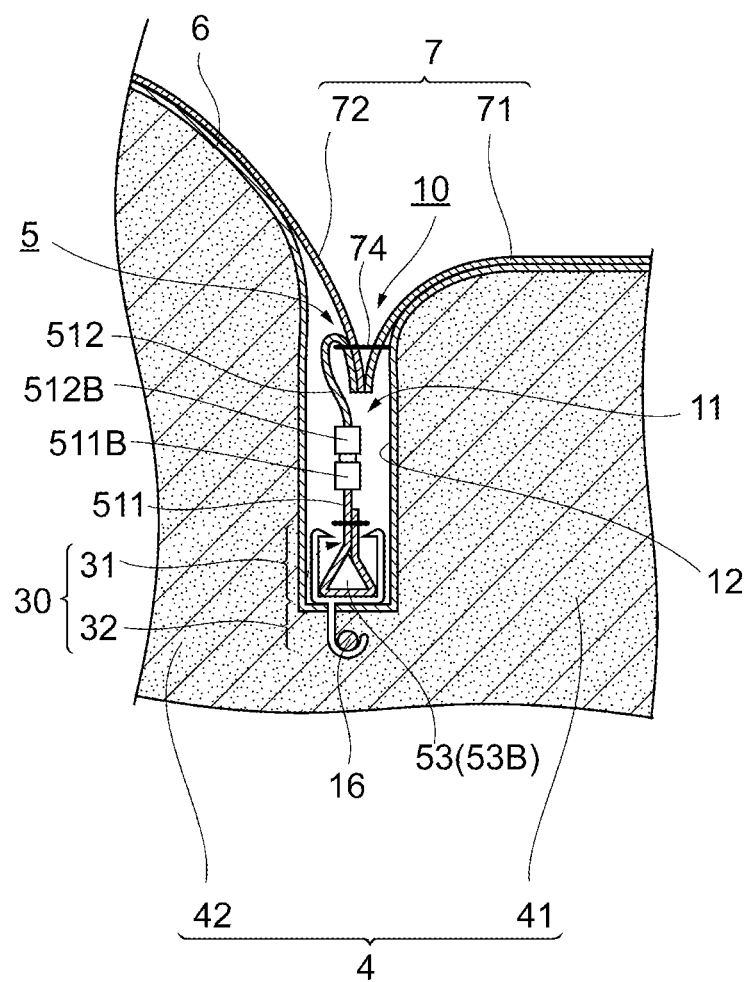
FIG. 11 is a cross-sectional view illustrating a state in which the plastic cord (locked part) is rotated in the hooking structure illustrated in FIG. 10.

In still another example, the end of the base-side tape part 511 is sewn into a bag shape to form a loop 511L and then the plastic cord 53B is inserted into the loop 511L, thereby enabling the configuration of the locked part 53 (see FIG. 10). Furthermore, if a hole part 511H is previously formed in a predetermined position of the loop 511L, the locking part 31 of the plastic clip 30 is able to be directly locked with the plastic cord 53B (see FIG. 10).

The insert wire 16 is buried inside the cushion material 4 of the backrest 3 and in a portion at a predetermined depth from the bottom of the concave portion 12 (see FIGS. 2 and 3: the groove depth direction of the concave portion 12 is indicated by character D in FIG. 3). The predetermined depth in the above is a depth appropriate for fixing the base-side tape part 511 of the fastening member 5 to the insert wire 16 with the plastic clip 30 in consideration of the size of the plastic clip 30 and the like at the time of fixing (see FIG. 3).

Although a specific shape of the insert wire 16 is not illustrated in the diagram, the insert wire 16 may be a wire that extends straight in a direction in which the concave portion 12 is formed (in the present embodiment, the vertical direction along the boundary between the main cushion part 41 and the side cushion part 42) or may be a wire in which a portion to which the plastic clip 30 is fixed is cranked so as to be closer to the concave portion 12. In addition, both ends of the insert wire 16 are bent and rounded.

The plastic clip 30 is a fixing member that is used to fix the base-side tape part 511 of the fastening member 5 to the seat member in the hooking groove 11 and has a locking part 31 and a fastening part 32 (see FIG. 3).

The locking part 31 is a portion that is used to lock the locked part 53 of the fastening member 5 and is flexible. The locking part 31 of the plastic clip 30 according to the present embodiment has a pair of locking claws (locking pieces) 31A facing each other and sandwiches the locked part 53 with the pair of locking claws 31A to hold the locked part 53 (see FIGS. 2 and 3 and the like).

Furthermore, on the back side (a portion facing outward) of each locking claw 31A of the locking part 31, there is formed an inclined plane 31B to which a force of pushing open the pair of locking claws 31A is applied when the locked part 53 is pressed (see FIG. 3 and the like). If the locked part 53 is thrust against the locking part 31, the force is applied to the inclined plane 31B and thereby the pair of locking claws 31A are automatically pushed open. Therefore, the locked part 53 is easily guided so as to be pushed into between the pair of locking claws 31A.

The fastening part 32 of the plastic clip 30 is a portion that hooks and locks the insert wire 16. The fastening part 32 of the plastic clip 30 according to the present embodiment is hook-shaped so as to be able to hook the insert wire 16 (see FIGS. 2 and 3, and the like). The plastic clip 30 having the fastening part 32 as described above is able to hold the fastening member 5 by hooking the insert wire 16 and is able to release the holding state by removing the hooking.

Moreover, a hole 65 is formed in the base trim cover 6, so that the plastic clip 30 locks the insert wire 16 through the hole 65 (see FIG. 2). In this case, the plastic clip 30 directly locks the insert wire 16 without intervention of the base trim cover 6, thereby enabling the locking force to be further increased in comparison with the case where the base trim cover 6 intervenes. Moreover, the hole 65 also has a function of marking 20 that indicates a place where the plastic clip 30 should be located. Furthermore, the hole 65 as described above is located inside the hooking groove 11 and therefore the hole 65 is kept out of sight of a seated person and the like.

Other hooking grooves 11 of the backrest 3 and other hooking grooves 11 in the seat bottom 2, and a hooking structure 10 formed by each of the hooking grooves are configured in the same manner as the above-described hooking structure 10. Therefore, their description will be omitted here.

In the hooking structure 10 for the seat 1 according to the present embodiment described hereinabove, the fastening member 5 is not stitched to the base trim cover 6 (in other words, the plastic clip 30, which fixes [the base-side tape part 511 of] the fastening member 5 to the cushion material 4, merely penetrates the base trim cover 6), and therefore the base trim cover 6 and the fastening member 5 are independent of each other and can be separated from each other.

Therefore, if the fastening member 5 is broken, it is possible to detach the plastic clip 30 to release the fixing and to detach only the fastening member 5 for replacement with the base trim cover 6 left as it is. In other words, since only the fastening member 5 is able to be replaced without replacement of the base trim cover 6, the repair cost required in the case of breakage of the fastening member 5 can be reduced.

Furthermore, in this hooking structure 10, a metal fixing member, which requires a dedicated attachment tool, is not used, but instead, the plastic clip 30, which enables a hooking work with bare hands, is used as the fixing member, and therefore no tool need not be used. This prevents a case of failure in handling or a problem caused thereby that could have occurred in the case where an inexperienced worker uses a tool. Moreover, the hooking work with the plastic clip 30 is composed of relatively simple works such as causing the locking part 31 to lock with the locked part 53 of the fastening member 5 and hooking the fastening part 32 on the insert wire 16, thereby not requiring high proficiency.

The following briefly describes a procedure for hooking the dressing cover 7 in the aforementioned hooking structure 10.

The plastic clip 30 is attached at a predetermined place of the locked part 53 of the fastening member 5 (see FIG. 2 and the like). To attach the plastic clip 30, the plastic clip 30 may be fitted into the end of the plastic plate 53A or the plastic cord 53B so as to slide, or alternatively, the plastic clip 30 may be locked by pressing the locking claws 31A apart by placing and pushing the plastic plate 53A or the plastic cord 53B against the aforementioned inclined plane 31B. Particularly, the locked part 53 is wedge-shaped like the plastic cord 53B, the locking claws 31A can be easily pressed apart.

Subsequently, the fastening part 32 of the plastic clip 30 is allowed to pass through the hole 65 of the base trim cover 6 and then is hooked on the insert wire 16 (see FIG. 2), thereby enabling fastening between the fastening member 5 and the insert wire 16 with the plastic clip 30.

Similarly, in other predetermined places, the fastening member 5 is fastened to the insert wire 16 with the plastic clip 30. As described above, the fastening member 5 is able to be hooked into the hooking groove 11 together with a part of the dressing cover 7 (see FIG. 3).

Additionally, hooking the dressing cover 7 into the hooking groove 11 requires both of the work of locking the locked part 53 of the fastening member 5 with the locking part 31 of the plastic clip 30 and the work of hooking the fastening part of the plastic clip 30 on the insert wire 16 as described above. Note that, however, the order of the works is not particularly limited, but either of the works may precede the other.

Moreover, to detach the fastening member 5 from the cushion material 4, the following work is required.

Figure 4:
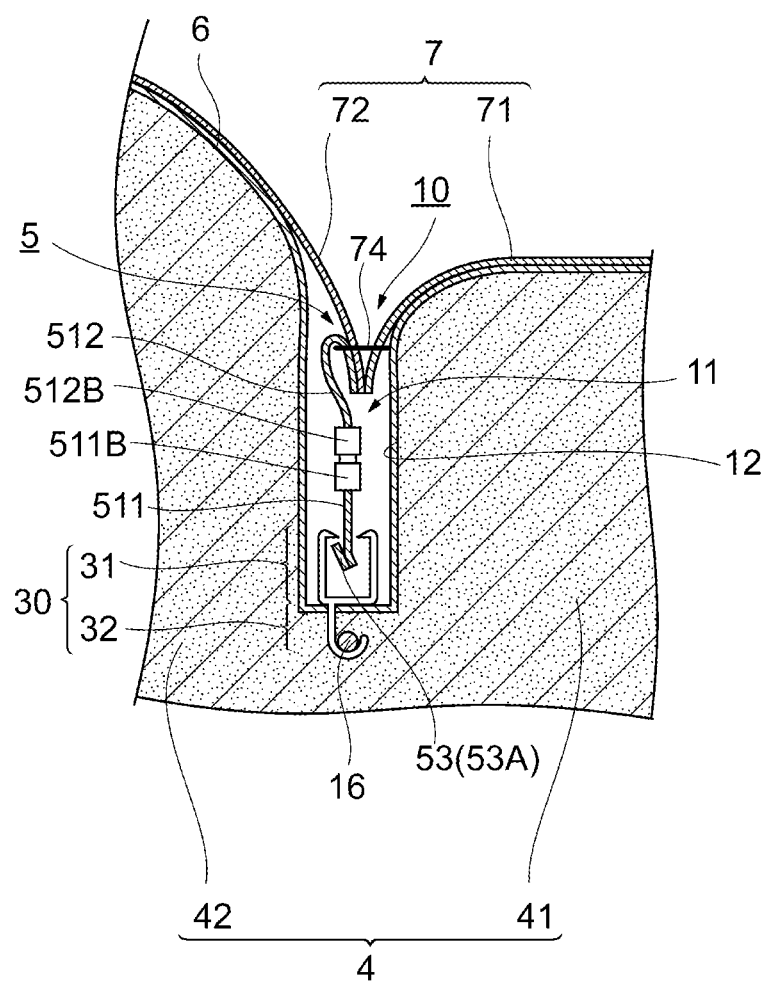
FIG. 4 is a cross-sectional view illustrating a state in which a plastic plate (locked part) is rotated in the hooking structure illustrated in FIG. 3.
Figure 5:
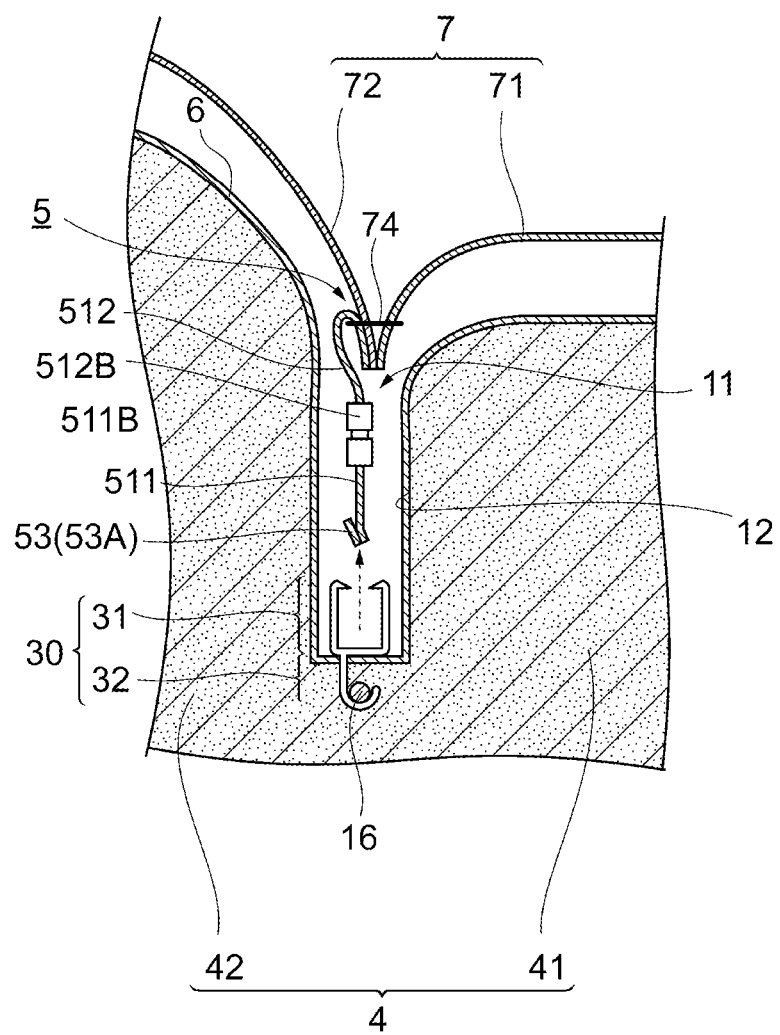
FIG. 5 is a cross-sectional view illustrating a situation in which the plastic plate (locked part) is detached from a plastic clip.

Specifically, fingers are inserted into the hooking groove 11 to pick the plastic plate 53A up with the fingers in the vicinity of the plastic clip 30 and then to give a twist to and rotate the plastic plate 53A (see FIG. 4). This releases the state in which the locked part 53 (the plastic plate 53A) is locked with the locking part 31 of the plastic clip 30. Thus, the locked part 53 is pulled out from the locking part 31 of the plastic clip 30 directly (see FIG. 5). This work is performed for other plastic clips 30 and then the locked part 53 (plastic plate 53A) is pulled out from all the plastic clips 30, thereby enabling the fastening member 5 to be detached from the cushion material 4.

Figure 9:
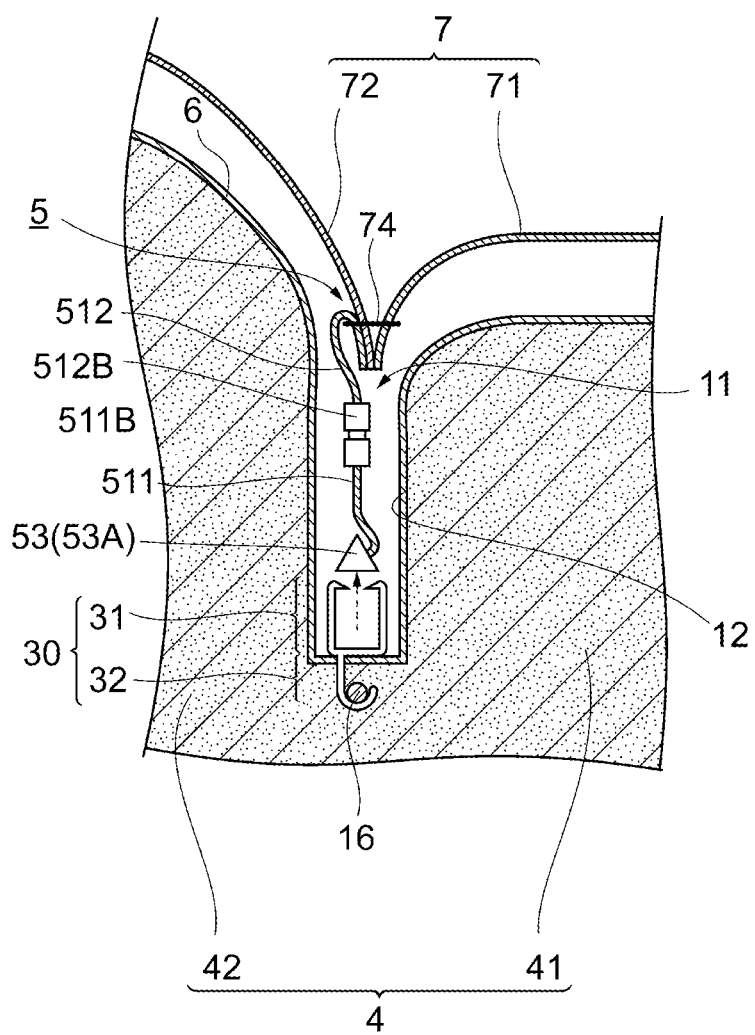
FIG. 9 is a cross-sectional view illustrating a situation in which the plastic cord (locked part) is detached from the plastic clip.

Furthermore, in the case where the locked part 53 is composed of a plastic cord 53B having a wedge-shaped cross section (see FIGS. 6 and 7), the plastic cord 53B is rotated in the same manner as the above so that the wedge-shaped tip faces between the pair of locking claws 31A of the plastic clip 30 (see FIG. 8), and the locked part 53 (plastic cord 53B) is pulled out from the locking part 31 of the plastic clip 30 directly (see FIG. 9). This work is performed for other plastic clips 30 and then the locked part 53 (plastic cord 53B) is pulled out from all the plastic clips 30, thereby enabling the fastening member 5 to be detached from the cushion material 4.

Figure 12:
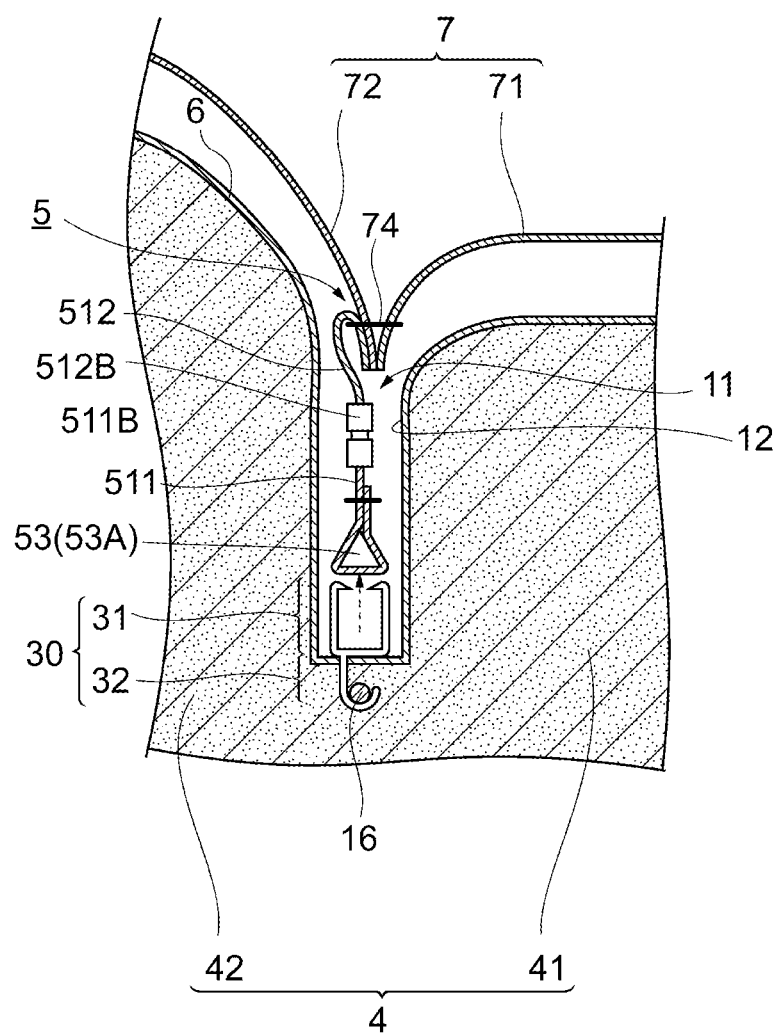
FIG. 12 is a cross-sectional view illustrating a situation in which the plastic cord (locked part) is detached from a plastic clip.

Furthermore, in the case where the plastic cord 53B is inserted into the loop 511L of the base-side tape part 511 (see FIG. 10), the plastic cord 53B is similarly rotated so that the wedge-shaped tip faces between the pair of locking claws 31A of the plastic clip 30 (see FIG. 11), and the locked part 53 (plastic cord 53B) is pulled out from the locking part 31 of the plastic clip 30 directly together with the loop 511L (see FIG. 12). This work is performed for other plastic clips 30 and then the locked part 53 (plastic cord 53B) is pulled out from all the plastic clips 30 together with the loop 511L, thereby enabling the fastening member 5 to be detached from the cushion material 4.

As described above, the fixing member in the hooking structure 10 according to the present embodiment is the plastic clip 30 and has the flexible locking part 31. Therefore, the locked part 53 of the fastening member 5 is able to be unlocked by deflecting and deforming the locking part 31. The work of deforming the plastic locking part 31 in this manner is able to be performed with bare hands, which enables a hooking work or a work of detaching the fastening member 5 without using a tool.

Although the above embodiments are merely preferred embodiments of the present invention, the present invention is not limited thereto, but various modifications can be made without departing from the scope and principles of the present invention. For example, the seat 1 to which the hooking structure 10 according to the present invention is applied can be used for an automotive seat, an aircraft seat, a passenger ship seat, a railway vehicle seat, and the like.

Furthermore, the provision of the insert member such as the insert wire 16 in the cushion material 4 as described above preferably alleviates local deformation of the cushion material 4 in the hooking structure 10 and makes it difficult for the plastic clip 30 to move or come off. If, however, the plastic clip 30 can be firmly fixed only with the use of the cushion material 4, the insert member need not necessarily be provided.

Figure 13:
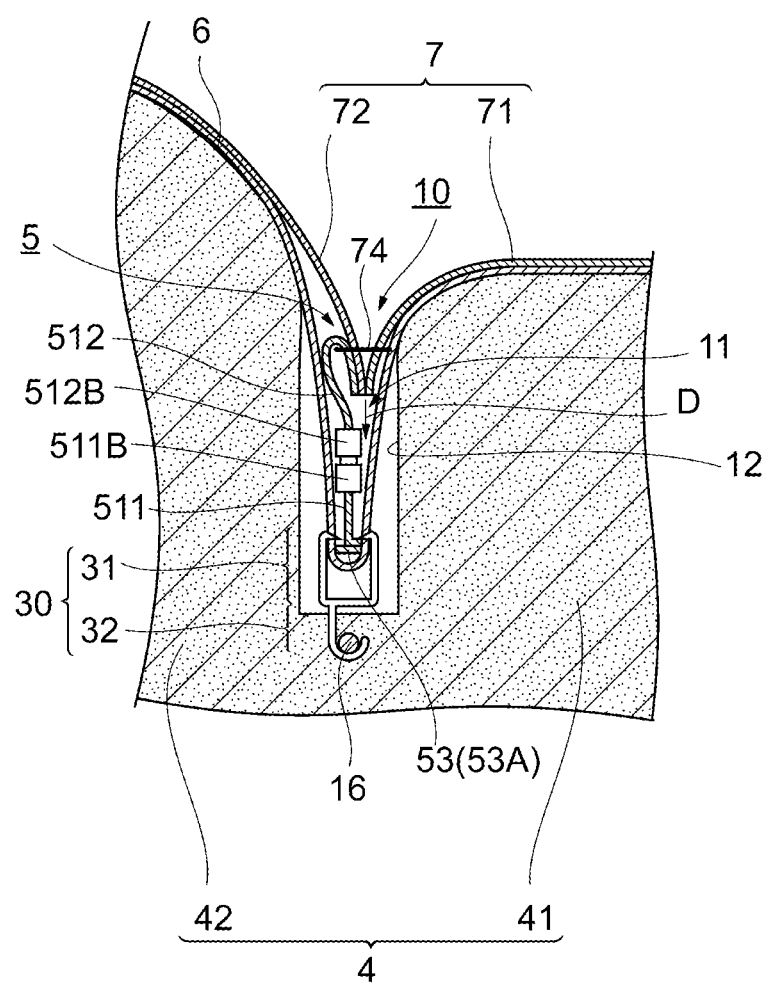
FIG. 13 is a cross-sectional view illustrating a hooking structure for a backrest (seat member) in the case where a base trim cover is secured to a cushion material by fixing the fastening member with the plastic clip.

Furthermore, while the above embodiments illustrate the cases where the surface of the cushion material 4 is coated with the base trim cover 6 by using, for example, an adhesive or integral foam molding (see FIG. 3), they are merely preferred embodiments. Besides, for example, the base trim cover 6 may be fixed to the fastening member 5 with the plastic clip 30 and also may be secured to the cushion material 4 (see FIG. 13).

Figure 14:
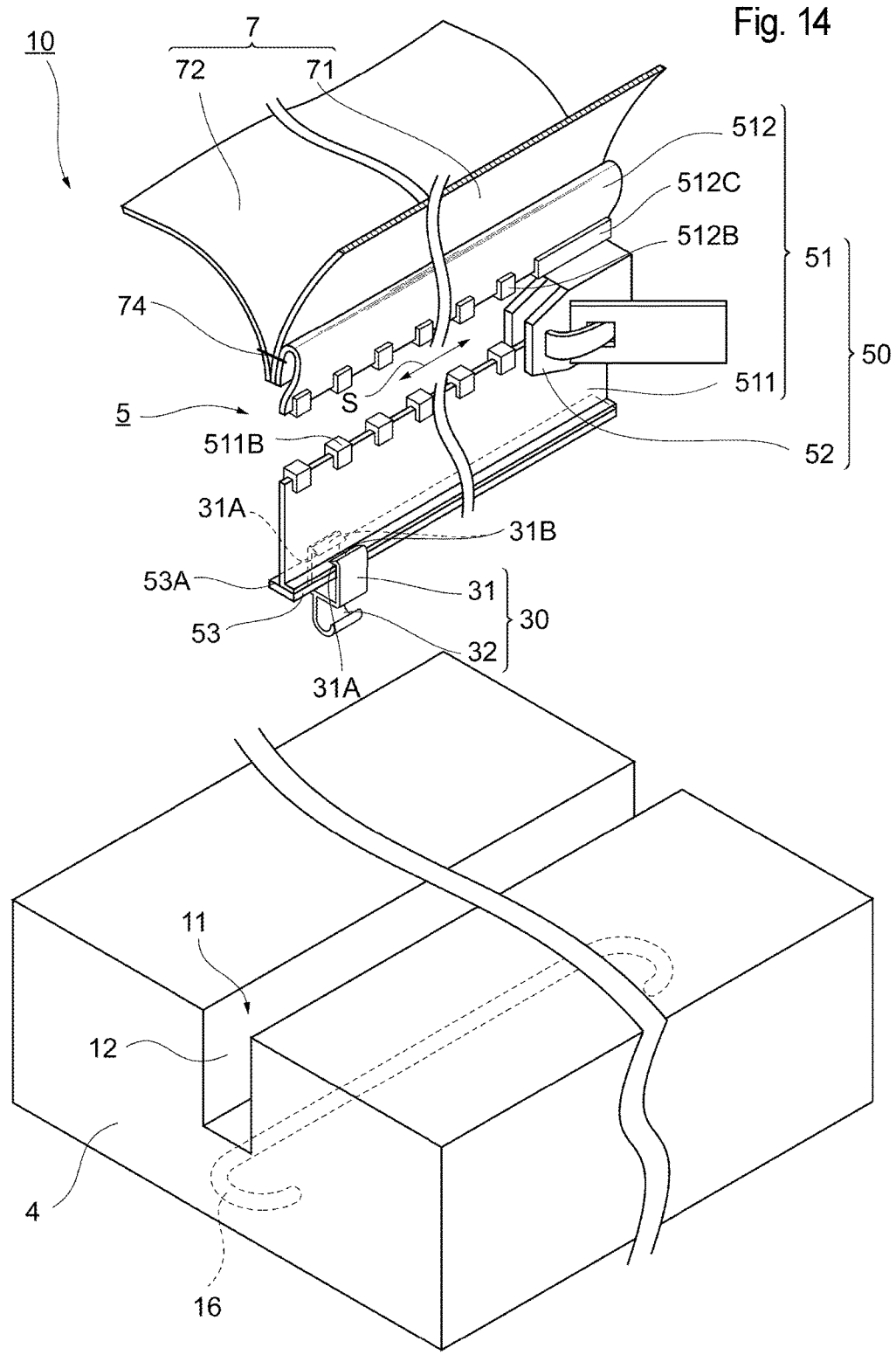
FIG. 14 is a perspective view illustrating another embodiment of the present invention.
Figure 15:
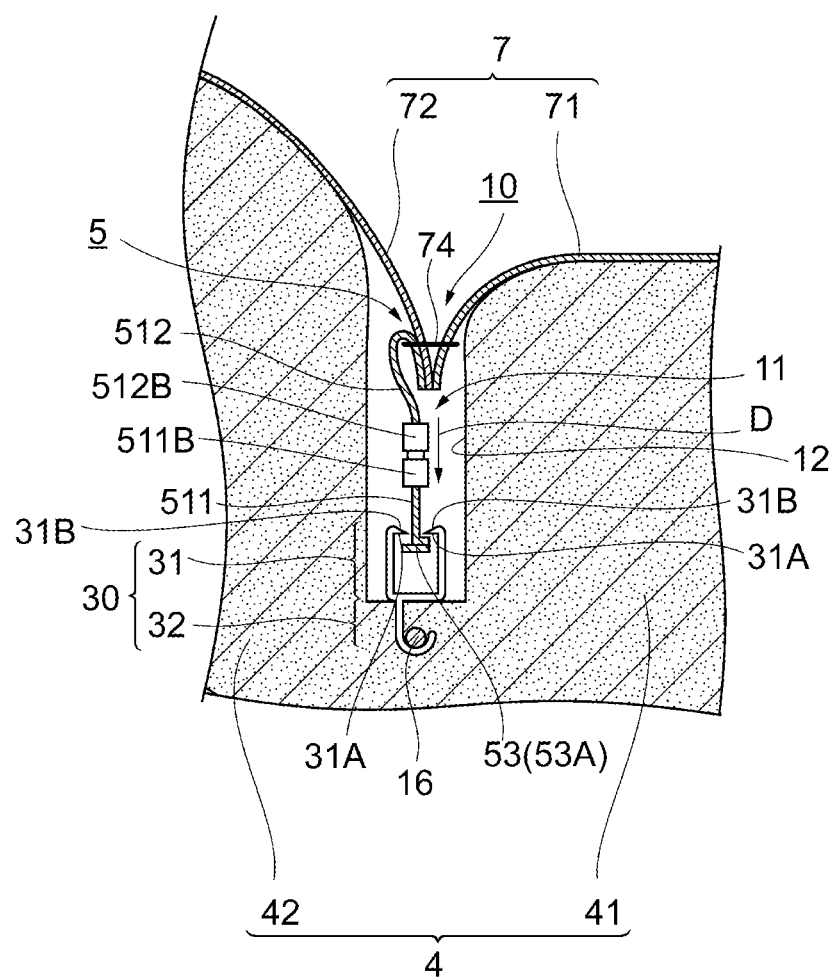
FIG. 15 is a cross-sectional view illustrating another embodiment of the present invention.

Furthermore, the present invention is also applicable to the hooking structure 10 for the seat 1 not provided with the base trim cover 6 (see FIGS. 14 and 15). In this seat 1, even if the slide fastener 50 is broken, no base trim cover is present in the first place and therefore the work of replacing a base trim cover itself is unnecessary. Therefore, similarly to the above embodiments, the locked part 53 of the fastening member 5 is able to be unlocked without using a tool by deflecting and deforming the flexible locking part 31 of the plastic clip 30. Moreover, in this seat 1, the simplification of the base trim cover enables a reduction in the number of parts and weight saving correspondingly.

Figure 16:
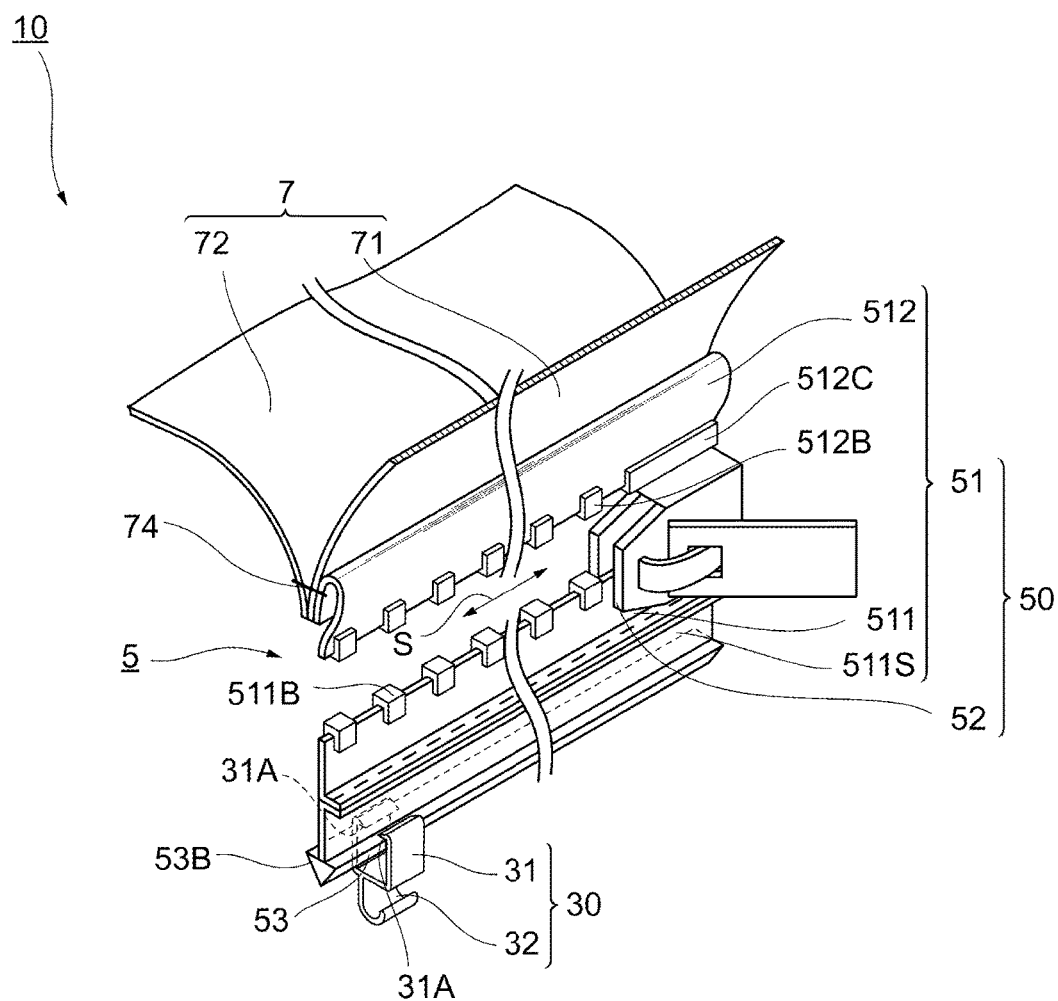
FIG. 16 is a perspective view illustrating still another embodiment of the present invention.

Although the hooking structure 10 in which the locked part 53 is formed at the edge of the base-side tape part 511 has been illustrated in the above embodiments, it is a merely preferred example in the case of providing the locked part 53 in the fastening member 5. Specifically, the locked part 53 may be directly formed in a part of the base-side tape part 511 (see FIG. 6) or another member with the locked part 53 formed in a part thereof may be attached so that a part of the base-side tape part 511 is a locked part 53. For example, in the embodiment illustrated in FIG. 16, a retrofittable suspender (joint member) 511S is used for the base-side tape part 511, where the locked part 53 is previously provided at the edge of the suspender 511S. Then, the other edge of the suspender 511S is attached to the base-side tape part 511, by which the base-side tape part 511 is provided with the locked part 53. As a method of attaching the suspender 511S to the base-side tape part 511, sewing, adhesion, pinning, or the like is used. According to this, the locked part 53 made of the plastic plate 53A and the like is previously plastic-molded in the suspender 511S and then the plastic-molded locked part 53 can be provided in the fastening member 5 together with the suspender 511S by sewing or the like.

Furthermore, in the structure in which the locked part 53 is previously plastic-molded in the suspender 511S in this manner, a long locked part 53 is previously plastic-molded in a long suspender 511S whose detailed size is not determined, so that the suspender 511S can be cut into a predetermined length and used. According thereto, the present invention is able to easily cope with various lengths of products and thus increases the versatility. In addition, it eliminates the necessity of separately making molds in plastic molding, thereby also having a cost advantage.

Although not specifically illustrated, the suspender 511S may be combined with the embodiment in which the locked part 53 is configured by forming the loop 511L by sewing the end of the base-side tape part 511 into a bag shape and inserting the plastic cord 53B into the loop 511L (see FIG. 10). Specifically, the loop 511L is formed by sewing the edge of a retrofittable suspender 511S into a bag shape to form a loop 511L and then the other edge of the suspender 511S is attached to the base-side tape part 511, thereby enabling the base-side tape part 511 to be provided with the locked part 53.

INDUSTRIAL APPLICABILITY

The present invention is preferably applied to a hooking structure for a seat in which a dressing cover is fittable or removable to or from the seat member with a base trim cover.

REFERENCE SIGNS LIST

1: SEAT
2: SEAT BOTTOM (SEAT MEMBER)
3: BACKREST (SEAT MEMBER)
4: CUSHION MATERIAL
5: FASTENING MEMBER
6: BASE TRIM COVER
7: DRESSING COVER
10: HOOKING STRUCTURE
11: HOOKING GROOVE (GROOVE PART FOR HOOKING)
16: INSERT WIRE (INSERT MEMBER)
30: PLASTIC FIXING CLIP (FIXING MEMBER)
31: LOCKING PART
31A: LOCKING CLAW

31B: INCLINED PLANE
32: FASTENING PART
50: SLIDE FASTENER
51: FASTENER PART
52: SLIDER PART
53: LOCKED PART (LOCKED WITH LOCKING PART 31 OF PLASTIC CLIP 30)
53A: PLASTIC PLATE
53B: PLASTIC CORD
53C: PLASTIC CORD
65: HOLE (OF BASE TRIM COVER 6)
74: STITCHED PART (ANCHORING PART)
511: BASE-SIDE TAPE PART (ONE FASTENER HALF PART)
511S: SUSPENDER
512: COVER-SIDE TAPE PART (THE OTHER FASTENER HALF PART)

What is claimed is:

1. A hooking structure for a seat in which a dressing cover is hooked to be supported removably from a seat member provided with a base trim cover, comprising:
a fastening member that is configured from an open-type slide fastener and is not stitched to the base trim cover, where the open-type slide fastener includes a fastener part that is formed of one fastener half part and the other fastener half part and a slider part that slides along the fastener part to open and close the one fastener half part and the other fastener half part; and
a plastic fixing member that fixes the one fastener half part to the seat member in a groove part for hooking formed in the seat member,
wherein:
the fastening member is provided with a locked part;
the fixing member is provided with a flexible locking part that locks the locked part; and
the other fastener half part and the dressing cover are anchored together by an anchoring part.

2. The hooking structure for a seat according to claim 1, wherein the locking part of the fixing member has a pair of locking claws that sandwich the locked part.

3. The hooking structure for a seat according to claim 2, wherein the locked part has a wedge-shaped cross section.

4. The hooking structure for a seat according to claim 2, wherein the fixing member has an inclined plane for applying a force of pushing open the pair of locking claws upon pressing of the locked part.

5. The hooking structure for a seat according to claim 2, wherein the locked part has a rectangular cross section.

6. The hooking structure for a seat according to claim 1, wherein the seat member is provided inside with an insert member that locks the fixing member and the fixing member has a fastening part able to be hooked on the insert member.

7. The hooking structure for a seat according to claim 1, wherein the locked part includes a plastic molding product.

8. The hooking structure for a seat according to claim 7, wherein the locked part is formed of a plastic plate integrated into the one fastener half part.

9. The hooking structure for a seat according to claim 7, wherein the locked part is formed of a plastic cord integrated into the one fastener half part.

10. The hooking structure for a seat according to claim 7, wherein the locked part is formed of a plastic cord inserted into the one fastener half part that is sewn into a bag shape.

11. The hooking structure for a seat according to claim 8, wherein the locked part is provided in a joint member that constitutes a part of the one fastener half part.

12. The hooking structure for a seat according to claim 6, wherein a hole is formed in the base trim cover and the fixing member having passed through the hole locks with the insert member.

13. The hooking structure for a seat according to claim 9, wherein the locked part is provided in a joint member that constitutes a part of the one fastener half part.

14. A hooking structure for a seat in which a dressing cover is hooked to be supported removably from a seat member, comprising:
a fastening member that is configured from an open-type slide fastener, where the open-type slide fastener includes a fastener part that is formed of one fastener half part and the other fastener half part and a slider part that slides along the fastener part to open and close the one fastener half part and the other fastener half part; and
a plastic fixing member that fixes the one fastener half part to the seat member in a groove part for hooking formed in the seat member,
wherein:
the fastening member is provided with a locked part;
the fixing member is provided with a flexible locking part that locks the locked part;
the other fastener half part and the dressing cover are anchored together by an anchoring part;
the locked part includes a plastic molding product;
the locked part is formed of a plastic plate integrated into the one fastener half part; and
the locked part is provided in a joint member that constitutes a part of the one fastener half part.

15. The hooking structure for a seat according to claim 14, wherein the locking part of the fixing member has a pair of locking claws that sandwich the locked part.

16. The hooking structure for a seat according to claim 15, wherein the locked part has a wedge-shaped cross section.

17. The hooking structure for a seat according to claim 15, wherein the fixing member has an inclined plane for applying a force of pushing open the pair of locking claws upon pressing of the locked part.

18. The hooking structure for a seat according to claim 15, wherein the locked part has a rectangular cross section.

19. The hooking structure for a seat according to claim 14, wherein the seat member is provided inside with an insert member that locks the fixing member and the fixing member has a fastening part able to be hooked on the insert member.

* * * * *